FEEDBACK AMPLIFIER WITH ADJUSTABLE EQUALIZATION

Filed Dec. 7, 1964 2 Sheets-Sheet 1

INVENTORS J. J. FRIEND
W. R. LUNDRY
BY Roy M. Porter Jr.
ATTORNEY

United States Patent Office 3,383,616

Patented May 14, 1968

3,383,616

FEEDBACK AMPLIFIER WITH ADJUSTABLE EQUALIZATION

Joseph J. Friend, Cranford, and Walter R. Lundry, Summit, N.J., assignors to Bell Telephone Laboratories, Incorporated, New York, N.Y., a corporation of New York Filed Dec. 7, 1964, Ser. No. 416,365
15 Claims. (Cl. 330—26)

ABSTRACT OF THE DISCLOSURE

A pair of one-port variable impedance bridge networks are used in a two-stage feedback amplifier to obtain an adjustable equalizer arrangement. Equalization is obtained by means of a one-port bridge network of fixed D.C. and variable A.C. impedance where the break point frequency of the network is substantially independent of its A.C. impedance.

This invention relates to attenuation equalizing networks and more particularly to adjustable equalizers for the compensation of transmission lines and networks the attenuation of which is subject to variation.

The use of equalizing structures to compensate for the variation in the attenuation characteristics of transmission lines and other pieces of apparatus is well known in the communication art. Ordinarily, an equalizer has a definite characteristic fixed by the apparatus with which it is associated. It may happen, however, that the characteristic demanded of the equalizer cannot be prescribed in advance either because the characteristics of the associated apparatus are not known with precision or because they vary with time. Examples are found in the equalization of transmission lines, the exact length of which are unknown or the characteristics of which may be affected by changes in temperature and humidity.

Additionally, in recent years there has been evident a growing need for wide-band transmission facilities between locations separated by substantial distances. In such cases it would be economically advantageous to use existing cable facilities having nonuniform loss characteristics if the bandwidth thereof could be broadened in each situation by means of a simple routine adjustment of the gain by maintenance men using a minimum of equipment.

An equalizing technique employing a curve fitting scheme wherein the loss characteristic to be compensated is corrected by employing a number of individual equalizers to correct successive portions of the total bandwidth, provides the versatility required for the situation enumerated above. The arrangements existing in the prior art for providing variable equalization, however, are either complex two or more port networks with their associated limitations, or they comprise complex networks employing out of necessity inductors having the disadvantages of large physical size and cost. Also, because a curve fitting scheme wherein each equalizer network corrects an assigned portion of the total bandwidth requires, if a simple equalizing technique is to be attained, a minimum of interaction between sections, and because the loss characteristic to be equalized is a variable, the numerous simple doublet networks without inductors, such as those used in tone control applications, are inadequate. The important shortcoming of such networks characterized by immittance functions (the term immittance is herein used generically to represent either impedance or admittance in accordance with standard terminology) having low and high frequency values of different magnitudes separated by sloping portions, resides in the fact that the lower break point frequency (which is the only one that is important here and consequently the only one that will be considered) or their immittance characteristics is dependent upon the slope of the immittance function which in turn is a function of the adjustment made in a variable network component. Consequently, either insufficient gain variation results from the attempt to be outside the deleterious effect of shifting break point frequency, or alternatively, in the attempt to obtain a sufficient range of gain variation, both too coarse a correction is obtained in the equalization attempt and an adverse effect on a preceding network results from the gain adjustment of a succeeding network.

Accordingly, it is an object of this invention to provide a relatively simple doublet network having a wide range of slope variation in its immittance function coupled with a break point frequency which is independent of said slope.

Another object of this invention is to provide a plurality of cascaded amplifier stages having individually adjustable equalizer networks each of which provides gain adjustments over specified portions of a frequency band without interaction therebetween.

It is still another object of this invention to provide a simple variable equalizer network including a single potentiometer for the adjustment of the slope of the immittance characteristics without affecting D.C. conditions thereof.

In accordance with the objects of this invention it has been found that a variable impedance one-port bridge-type network of fixed D.C. impedance employing a single potentiometer for adjusting the slope of the A.C. immittance thereof, can be included in a feedback amplifier scheme to provide equalization over a band of frequencies. While the network in its simplest form consists of a resistance bridge with a single capacitor across the balance points of the bridge, a generalized RLC impedance may be substituted for the capacitor to provide characteristic responses having arbitrary shapes between substantially fixed upper and lower break point frequencies.

A number of feedback amplifiers can be arranged in a cascaded chain to provide equalization over as wide a bandwidth as desired or for equalizing arbitrarily small frequency segments of a fixed bandwidth in order to obtain arbitrarily precise equalization. Moreover, the arrangement provides a simple technique for equalization in that each potentiometer in turn can be adjusted at its fixed correction frequency (corresponding to the beginning of that frequency interval over which it produces its correction in accordance with the above-mentioned curve fitting technique) with a minimal effect on the previous adjustments to networks earlier in the chain.

Other objects and features of this invention will be better understood upon a consideration of the following detailed description of the invention as presented hereinbelow in connection with the accompanying drawing in which.

Figure 1:
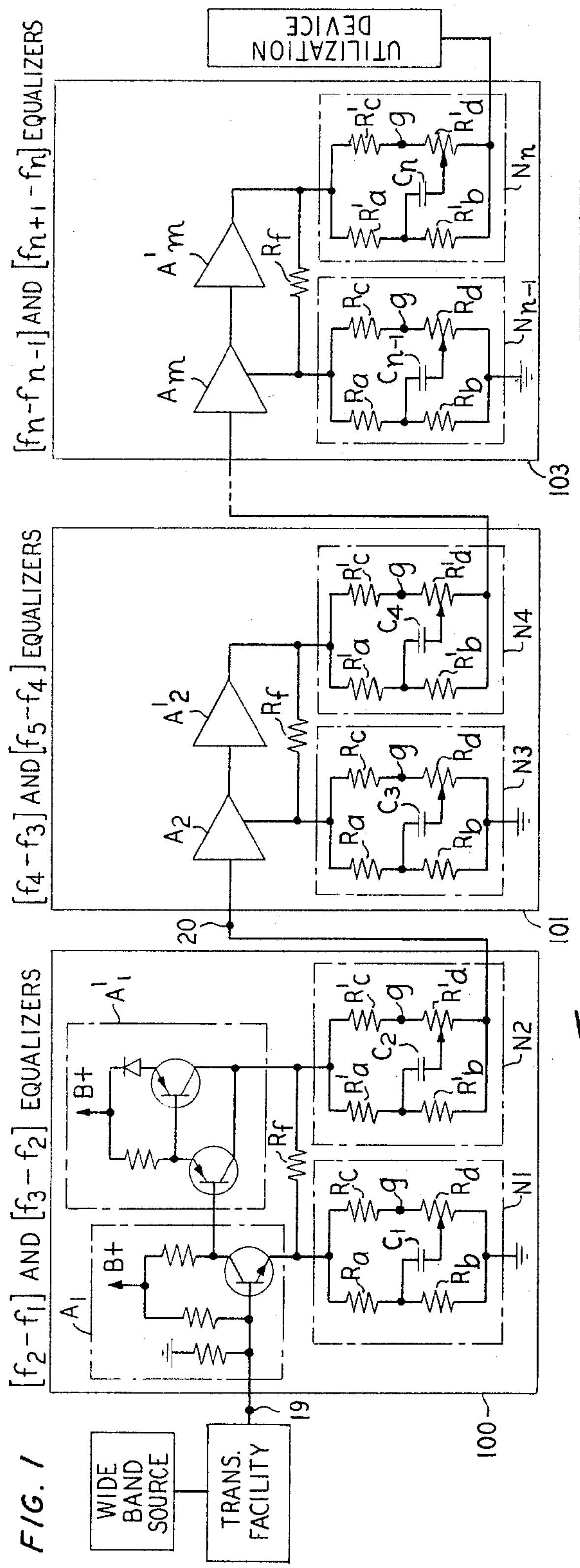
FIG. 1 shows in schematic form the principal embodiment of the invention wherein a number of one-port bridge-type networks are included in a cascaded feedback amplifier configuration to provide variable attenuation equalization.

In accordance with a principal embodiment of the invention, FIG. 1 shows a wide-band source, the signals of which are transmitted through a transmission facility having an unknown loss characteristic which distorts the source signal. Therefore, in order to provide the utilization device with signals which are substantially the same as those transmitted from the source, a number of equalizers are connected as shown. In order to provide a means for compensating against any randomly appearing loss characteristic that may be presented by the transmission facility, each of the equalizers is arranged to provide a substantially linear gain characteristic with an adjustable slope operative over an assigned portion of the total bandwidth to be corrected. As shown in FIG. 1, a number of feedback amplifiers of which amplifier 100 is typical are connected in cascade. As in amplifier 100, each cascaded amplifier is provided with a pair of stages such as stages $A_1$ and $A_1'$ and a pair of one-port bridge-type networks such as $N_1$ and $N_2$ composed entirely of RC elements and having immittance characteristics which display a fixed lower break point frequency about which the angle of a sloping portion may be varied by the adjustment of a potentiometer included in the network. The value of the break point frequency for each network is chosen by appropriate selection of the capacitor. More particularly in each amplifier the first stage such as $A_1$ in amplifier 100 consists of a common emitter transistor amplifier having the above-described one-port bridge network $N_1$ connected to the emitter and the second stage, typified by stage $A_1'$, is designed to provide high gain and stability and is shown here as a "piggyback" or "hook" circuit such as that described in Patent 2,663,806 granted to S. Darlington. In each amplifier, as shown in amplifier 100, the stages are D.C. coupled with the second stage $A_1'$ being coupled to the output terminal 20 of the amplifier by means of another one-port bridge-type network $N_2$. A resistor $R_f$ is connected as part of the feedback circuit between the output of stage 2 and the emitter terminal of stage 1. While the "hook" circuit is used as the second stage amplifier, no such restrictive requirement is necessary. This arrangement is merely used for convenience to provide a high gain stabilized amplifier stage so that large quantities of feedback may be used to produce desirable features of stability in accordance with procedures familiar to those versed in the art.

The values of the load impedance seen at the output terminal of each amplifier (e.g., the impedance at terminal 20 seen looking into stage $A_2$) and of the feedback resistor $R_f$ can be selected in a manner familiar to those versed in the art so that the gain expression for amplifier 100 is approximately inversely proportional to the product of the impedance of networks $N_1$ and $N_2$. Consequently, by varying the potentiometer setting for each network, the gain of the amplifier between terminals 19 and 20 can be varied in a piecewise linear fashion over the two bandwidth intervals in which each of the respective networks have approximately linear slopes. Thus, if at the break point frequency of network $N_1$ the equalized gain (corresponding to a power level at the source which is identical to the utilization device) is present and the slope of the gain characteristic produced by varying the potentiometer in network $N_1$ is adjusted so that the gain magnitude equals the transmission facility loss at the frequency corresponding to the break point frequency of network $N_2$ the transmission facility loss will have been equalized over the incremental bandwidth between the break point frequencies of networks $N_1$ and $N_2$. Correspondingly, if now the slope of the gain characteristic of network $N_2$ is adjusted so that the gain at the break point frequency $f_3$ of network $N_3$ in the first stage $A_2$ of amplifier 101 is made equal to the transmission facility loss at that frequency, the equalization is extended a second incremental bandwidth corresponding to the difference in break point frequencies between networks $N_3$ and $N_2$. Since each network $N_1$, $N_2$, $N_3$ . . . is designed so that its immittance function is constant below its break point frequency which is made substantially independent of its potentiometer setting and consequently gain slope, the adjustment of any network in the chain produces no substantial effect in the gain setting at frequencies lower than the break point frequency and consequently there is no appreciable interaction between amplifier adjustments. Further, the fact that each network is separated from an adjacent network by a stage of amplification assures isolation therebetween so that the impedance of one does not load the impedance of the other.

Because of the features of the network and the circuit in which it operates, any number of amplifiers similar to amplifier 100 may, within practical limitations, be cascaded as shown. Thus, amplifier 101 following amplifier 100 could provide adjustable equalization over a second pair of incremental bandwidths if the gain adjustments described above were continued in accordance with the curve fitting scheme outlined. The transmission facility loss characteristics can be approximated in this fashion with any arbitrary degree of precision desired by choosing the break point frequencies of the variable impedance networks to be closer together and by using a correspondingly larger number of amplifiers in cascade.

Figure 2A:
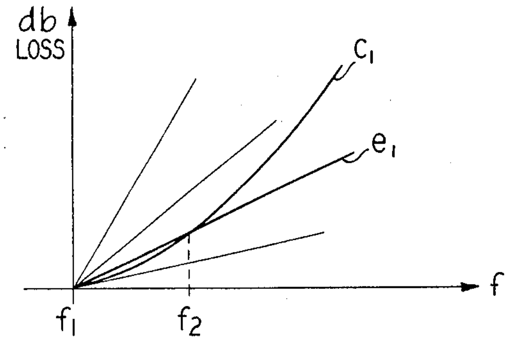
FIGS. 2A, 2B and 2C illustrate graphically a transmission facility loss characteristic and the technique employed for equalization thereof.

To further illustrate the curve fitting scheme employed, reference can be made to FIG. 2 and in particular FIG. 2A which shows a representative loss characteristic of the transmission facility. Since the loss characteristic will be a function of cable length, cable characteristics and atmospheric conditions, the loss in decibels versus frequency shown as curve $C_1$ is taken as a sample of one such transmission facility that might be presented. Plotted on the same coordinates are a number of idealized curves representing part of the family of characteristics obtained when potentiometer $R_d$ in network $N_1$ is varied. If the potentiometer $R_d$ is adjusted so that curve $e_1$ is the resulting characteristic, then the gain introduced by amplifier 100 at frequency $f_2$ is exactly equal to the transmission facility loss at that frequency which is selected to correspond to the break point frequency of network $N_2$.

Figure 2B:
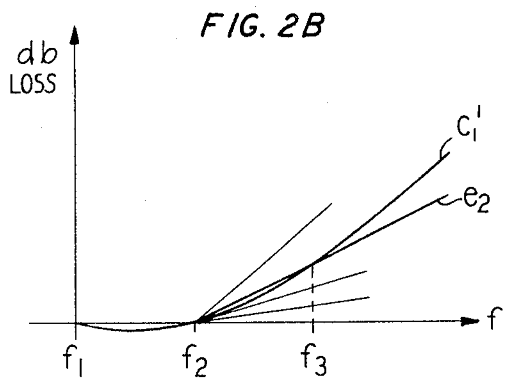

The partially equalized transmission facility characteristic is represented in FIG. 2B as curve $C_1'$ (the result of combining loss curve $C_1$ with gain curve $e_1$) and the error in the quantity of equalization inserted is shown as the deviation from zero gain between frequencies $f_1$ and $f_2$.

Figure 2C:
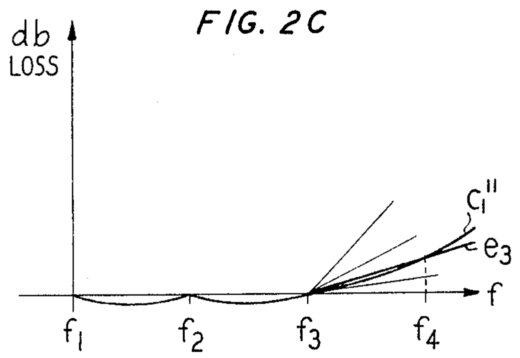

The next step of the curve fitting scheme is to correct curve $C_1'$ between frequencies $f_3$ and $f_2$ by the same technique described. In other words, network $N_2$ having a family of idealized immittance characteristics corresponding to the ramp functions shown in FIG. 2B or having a gain of zero at frequencies below $f_2$ and a sloping portion which linearly increases with frequency and which intersects curve $C_1'$ at frequencies $f_2$ and $f_3$ is adjusted by means of potentiometer $R_d'$ until curve $e_2$ is obtained. As before, the potentiometer is varied until the gain of amplifier 100 at frequency $f_3$ corresponding to the break point frequency of network $N_3$ in the next adjacent amplifier 101 is made equal to the transmission facility loss at that frequency. As a result of the equalization supplied by networks $N_1$ and $N_2$, the partially corrected loss characteristic of the transmission facility is now represented by curve $C_1''$ in FIG. 2C. The departure from a flat response at frequencies below $f_3$ is again only a ripple deviation. The curve fitting technique can be continued so that network $N_3$ having the family of idealized gain characteristics shown in FIG. 2C is adjusted by means of its potentiometer $R_d$ to select curve $e_3$ which in the above fashion provides equalization between frequencies $f_4$ and $f_3$.

The loss characteristic of the equalized transmission line can be made to be arbitrarily flat with a ripple deviation as small as desired simply by selecting the frequency intervals to be arbitrarily small. In other words, given a transmission line having a loss characteristic represented by curve $C_1$ in FIG. 2A, the equalized characteristic can, within an arbitrarily fixed bandwidth, be made as flat as desired by including, as shown in FIG. 1, a sufficient number of cascaded amplifiers having equalizer networks so that the incremental corrections are sufficiently small.

It is to be noted that the idealized gain characteristic attributable to each of the variable equalizer networks $N_1$, $N_2$, $N_3$ . . . $N_n$ is a ramp function having a zero gain at frequencies lower than the break point frequency so that gain introduced by a network $N_M$ does not affect the characteristic as already corrected at frequencies below $f_M$.

It may also be noted that each of the networks connected in the emitter circuit of each first stage amplifier is identical except for the value of capacitance used. So also are each of the coupling networks bearing the primed designation identical except for the value of capacitance selected. In fact the resistance values for both of the networks can be identical or in a fixed ratio to each other, if desired, with only the limitations of amplifier impedance level to limit the design parameters.

Because the networks provide immittance characteristics which result in the family of amplifier gain curves shown in FIG. 2, the equalization procedure to be used in broadbanding the transmission facility is greatly simplified. If all of the networks are initially arranged so that they are at balance with the center tap of the potentiometer set to point $g$ in FIG. 1, then the amplifiers between the transmission facility and the utilization device introduce no equalization and a signal applied over the cable is transmitted therethrough without alteration and a reference power level can be established. If now the respective potentiometers of networks $N_1$ and $N_2$ are sequentially adjusted so that in response to the successive transmission of signal frequencies $f_2$ and $f_3$ the power level at the utilization device is adjusted to zero decibels, and this procedure is continued in each of the stages of each of the succeeding amplifiers, the desired equalization will have been attained. Generally speaking, there will be no need at the end of this procedure to recalibrate each of the previous potentiometer settings since the tail on the immittance characteristic of each network is insignificant despite the provision at this frequency of a great range of gain slopes. However, due to the fact that the realizable equalization curves of each stage are an approximation of the idealized curves, the above procedure may, if desired, be repeated to obtain even closer approximation to the desired response.

Thus, when the zero decibel level is measured at the utilization device at correction frequency $f_3$, no significant additional gain will appear at the utilization device at correction frequency $f_2$. Moreover, it may be recognized that the networks used, unlike two or more port networks which have been arranged to provide a transmittance (as opposed to an immittance) function having a family of characteristic curves of a similar shape to those shown in FIG. 2, do not have to suffer the disadvantage of a large D.C. loss in order to obtain the large gain slopes required. In the two-port transmittance networks, in order to obtain large variation in gain slopes, large D.C. loss must be suffered and consequently there is required large amplifier gain and therefore poor noise characteristics if the D.C. loss suffered is to be neutralized. Another feature of the network which is of some importance is the independence of the network D.C. impedance with potentiometer setting. The A.C. gain of the circuit can thus be adjusted at will without any adverse effects upon the D.C. and biasing conditions of the amplifier.

Figures 4B, 4C:
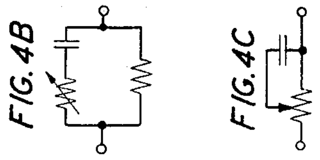
FIG. 4A illustrates the characteristics of prior art networks such as those shown in FIGS. 4B and 4C.
Figure 4A:
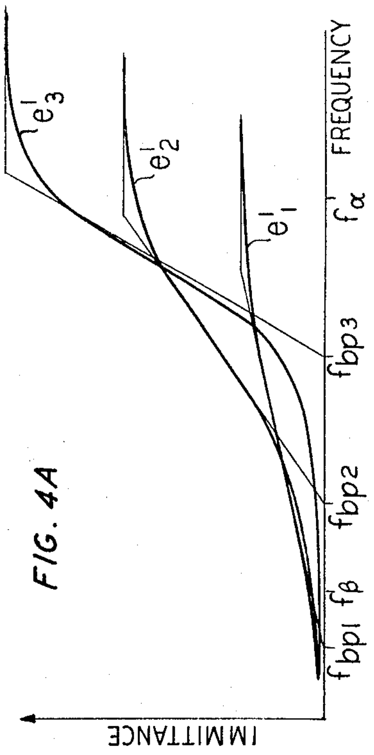
Figure 3:
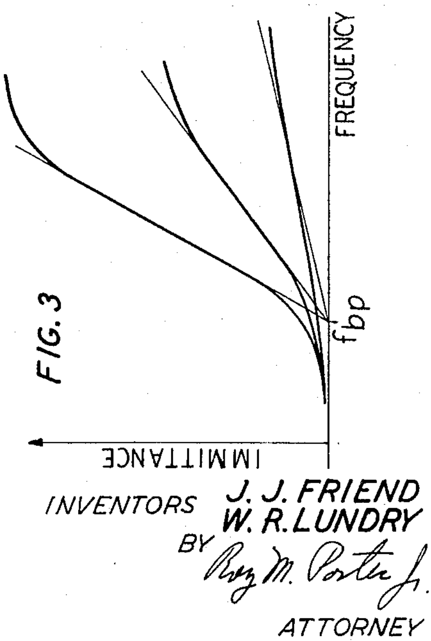
FIG. 3 shows the immitance characteristic of the networks used in the invention.

The actual family of immittance characteristic curves for each of the networks $N_1$, $N_2$ . . . $N_n$ of the circuit of FIG. 1 are shown plotted in FIG. 3 with the idealized characteristics described in connection with FIG. 2 as asymptotes. These curves may be compared with the curves shown in FIG. 4A representing the immittance characteristics of prior art doublet networks such as those shown in FIGS. 4B and 4C which also employ no inductors and which utilize a single potentiometer for adjusting the slope of the immittance characteristic of the network. Even a cursory examination of the characteristics shown in FIG. 4A will reveal that the doublet networks associated therewith are inadequate to provide equalization of an unknown transmission facility since the location of the break point frequency varies with potentiometer setting. For example, the prior art doublet networks exemplified in FIGS. 4B and 4C produce a family of characteristic immitance characteristic curves such as $e_1'$, $e_2'$, $e_3'$ . . . having potentiometer setting as a parameter. The curves exhibit a variable slope which is a function of the potentiometer setting but which at the same time have shifting break point frequencies $f_{bp1}$, $f_{bp2}$ and $f_{bp3}$ corresponding respectively to curves $e_1'$, $e_2'$ and $e_3'$ (which in turn correspond to the potentiometer setting).

It is evident that networks having this type of family of characteristics are inadequate in a curve fitting scheme in which equalizers are cascaded if consideration is given to the effect of the shifting location of the break point frequency with gain as determined by the potentiometer setting. Since there is no one fixed break point frequency, if the network element values are chosen so that the correction frequency or frequency about which the gain slope is to be varied falls at the low end of the frequency scale in FIG. 4A, such as in the neighborhood of frequency $f_\beta$, then the immittance or gain of the network is substantially unaffected by diverse potentiometer settings and consequently the network cannot be used to correct for the wide variations in transmission line loss that can be expected. Alternatively, the elements of the equalizer network can be chosen so that the correction frequency assigned to the network falls at the high end of the frequency scale of FIG. 4A such as in the neighborhood above $f_\alpha$. This selection will afford sufficient variation in gain to compensate for the various loss conditions that might be presented but the value of gain below this correction frequency is appreciable due to the tails of the characteristic curves. In other words, if the network is designed so that the correction frequency appears on the characteristics as $f_\alpha$ then the gain below frequencies of $f_\alpha$ is not insignificant, and consequently, if in FIG. 1 one type of the prior art networks having the above-described characteristics were substituted for networks $N_1$, $N_2$ . . . $N_n$, an adjustment of the substituting network $N_3$ to provide the necessary correction at frequency $f_4$ will produce at correction frequency $f_3$ overcompensation due to the additional gain corresponding to the nonzero ordinate at frequency $f_3$ of the immittance curve selected by the potentiometer setting. That is, after network $N_2$ had been adjusted to supply the required gain at correction frequency $f_3$, the setting of network $N_4$ to provide correction at $f_4$ will introduce additional gain at frequency $f_3$ and thereby upset the equalization obtained previously by providing at frequency $f_3$ more gain than that desired. An additional undesirable feature resulting from the positioning of the correction frequency at $f_\alpha$ (the high end of the frequency scale of the characteristic curve) is that the frequency interval over which this network is to provide equalization must consequently be very large and therefore provide a poorer approximation to the loss curve. It should also be obvious that a positioning of the correction frequency intermediate the high and low ends does not improve the situation since then the problems existing at both ends are presented.

In summary, it should be clear that if an unknown transmission facility loss characteristic is to be compensated in a piecewise fashion, the type of equalization characteristic required is one which exhibits a fixed break point frequency about which the slope of a substantially linear gain curve can be varied. This is the type of characteristic presented by the invention wherein a simple network arrangement has been employed in a feedback amplifier configuration.

As suggested above, a generalized RLC impedance may be substituted for the capacitor in any of the one-port bridge networks shown in FIG. 1 to provide over an incremental bandwidth a gain characteristic having substantially fixed upper and lower break point frequencies with more complex curvature therebetween. For example, if a circuit consisting of a series inductor, resistor and capacitor were substituted for the capacitor in any of the networks shown, a family of curves having potentiometer setting as a parameter and asymptotes which slopingly rise from each break point frequency to an intermediate frequency are obtained. Illustratively, this type characteristic may be useful in equalizing a loss characteristic having a sharp spike loss at some bandwidth frequency. Other shape responses are also possible by employing specific other networks in place of the network capacitor.

It is to be understood that the above-described arrangements are illustrative of the application of the principles of the invention. Numerous other arrangements may be devised by those skilled in the art without departing from the spirit and scope of the invention.

What is claimed is:

1. A variable gain equalizer comprising a first stage of amplification, a second stage of amplification cascaded with said first stage, and feedback means coupling said second stage to said first stage including a bridge network characterized by fixed D.C. impedance and adjustable A.C. impedance.

2. A variable gain equalizer in accordance with claim 1 wherein said network comprises a resistance bridge comprising a plurality of resistors, and a potentiometer connected to one of said plurality of resistors for adjusting said A.C. impedance.

3. A variable gain equalizer in accordance with claim 2 wherein said potentiometer has an adjustable tapping point for fixing the value of two arms of said bridge and wherein there is included between balance points of said bridge a reactive network.

4. A variable gain equalizer in accordance with claim 1 wherein said bridge network comprises a resistance bridge including a potentiometer having an adjustable tapping point, a pair of series resistors connected across said potentiometer and a reactive network connected from the junction point between said pair of series resistors and said adjustable center tap.

5. A variable gain equalizer comprising first and second stages of amplification and a bridge network interconnecting said stages, the impedance of said bridge network exhibiting a frequency characteristic characterized by a pair of substantially fixed break point frequencies, where said break point frequencies separate a region of constant impedance value and a region of increasing impedance value, said network including a plurality of impedance elements and a single potentiometer connected to one of said plurality of impedance elements for adjusting the A.C. impedance between said break point frequencies without affecting the D.C. impedance of said network.

6. A variable gain equalizer in accordance with claim 5 wherein said network further comprises a resistance bridge having a pair of balance points and a reactive network connected across said balance points.

7. A variable gain equalizer comprising a first stage of amplification, a second stage of amplification coupled in cascade to said first stage, feedback means for coupling said second stage to said first stage including a network having a doublet impedance characteristic characterized by a region of constant value and a region of increasing values separated by a frequency, said frequency being a break point frequency, said network having exclusively resistor and capacitor elements including a single potentiometer connected to one of said resistor elements for adjusting the A.C. impedance without substantially changing the value of said break point frequency.

8. An amplifier providing variable gain equalization over a fixed bandwidth comprising a first stage of amplification, a second stage of amplification coupled in cascade to said first stage, a first equalizer network coupled to said second stage, and feedback means including a second equalizer network coupling said second stage to said first stage in an arrangement for making said amplifier gain proportional to the product of the respective admittances of said first and second networks, said first and second equalizer networks having a bridge type structure with characteristic curves having a fixed break point frequency about which the slope of a linear portion is varied employing exclusively resistor and capacitor elements including a potentiometer having an adjustable tapping point for changing the slope of the A.C. impedance characteristic about said fixed break point frequency without affecting the D.C. impedance of said network and a capacitor selected to determine the location of said break point frequency, where said break point frequency separates a region of constant impedance value and a region of increasing impedance value.

9. An amplifier having input and output terminals for variable gain equalization over a fixed bandwidth comprising a first stage having an input terminal corresponding to said amplifier input terminal and having an output terminal, a second stage having an input terminal coupled to said first stage output terminal and having an output terminal, a first equalizer network coupling said second stage output terminal to said amplifier output terminal and a feedback path means including a second equalizer network connecting said second stage output terminal to said first stage to produce an over-all gain of said amplifier proportional to the product of the admittances of said first and second networks, each of said first and second equalizer networks comprising a one-port bridge type structure having a doublet admittance characteristic with a break point frequency and a sloping portion and including a pair of resistors serially connected between the terminals of said one port, a potentiometer parallelly connected across said pair of resistors with an adjustable tapping point for adjusting about said fixed break point frequency the slope of said sloping portion of said characteristic and a capacitor the value of which determines said break point frequency location connected between said adjustable tapping point and the junction of said pair of serially connected resistors.

10. An equalizer including a plurality of cascaded amplifiers connected to a point of source potential and a point of reference potential, each of said amplifiers having input and output terminals, a first stage having an input terminal corresponding to said amplifier input terminal, an output terminal, and a common terminal, a second stage having input and output terminals, said second stage input terminal connected to said output terminal of said first stage, a first two-terminal adjustable impedance network interconnecting said second stage output terminal and said amplifier output terminal, and a feedback network comprising a resistor coupling said second stage output terminal to said common terminal of said first stage and a second two-terminal adjustable impedance network coupling said common terminal to said point of reference potential, said first and second networks being arranged to vary the A.C. gain of said amplifier without varying the D.C. conditions thereof comprising a potentiometer having an adjustable tapping point for gain adjustment and a pair of terminals corresponding to said network terminals, a pair of serially connected resistors connected across said potentiometer terminals and a capacitor connected between said adjustable tapping point and the junction of said series resistors.

11. An equalizer including a plurality of cascaded amplifiers in accordance with claim 5 wherein said first stage comprises a transistor amplifier in a common emitter configuration having a base electrode corresponding to said first stage input terminal, an emitter electrode corresponding to said first stage common terminal, and a collector electrode corresponding to said first stage output terminal, and wherein said second stage comprises a first and a second transistor each of which having base, collector, and emitter electrodes connected in a hook circuit configuration with interconnected collector electrodes and with said first transistor base electrode corresponding to said second stage input terminal and said interconnected collector electrodes corresponding to said second stage output terminal.

12. An adjustable attenuation equalizer comprising a one-port bridge-type network of fixed D.C. impedance characterized by a pair of break point frequencies, where said break point frequencies separate a region of constant impedance value and a region of increasing impedance value, said network including a pair of balance points, a reactive network connected between said balance points and a potentiometer for adjusting the A.C. impedance of said network while maintaining said break point frequencies substantially constant.

13. An adjustable attenuation equalizer in accordance with claim 12 wherein said one-port network comprises a resistance bridge including a potentiometer having an adjustable tapping point corresponding to one of said balance points and a pair of series connected resistors connected in parallel with said potentiometer, said series resistors having a junction point corresponding to a second of said balance points.

14. An adjustable attenuation equalizer comprising a two-terminal network having a doublet impedance characterized by a sloping portion and break point frequency substantially independent of said slope including exclusively resistor and capacitor elements and a single potentiometer connected to one of said resistor elements for adjusting said sloping portion of said characteristic without affecting the D.C. impedance of said network arranged in a bridge configuration.

15. An adjustable attenuation equalizer comprising a two-terminal bridge network having a family of doublet immittance characteristic curves displaying a substantially fixed break point frequency about which the angle of a sloping portion may be varied including a pair of serially connected resistors, a potentiometer having an adjustable tapping point for changing the A.C. impedance without affecting the D.C. impedance of said network connected in parallel with said pair of resistors and a capacitor connected between the junction of said serially connected resistors and said adjustable tapping point for selecting said break point frequency.

References Cited

UNITED STATES PATENTS

| | | | |
|---|---|---|---|
| 2,658,958 | 11/1953 | Wells | 333—28 |
| 3,231,659 | 1/1966 | Mabuchi | 330—107 |

JOHN KOMINSKI, *Acting Primary Examiner.*

ROY LAKE, *Examiner.*

E. C. FOLSOM, *Assistant Examiner.*